United States Patent
Tian et al.

(10) Patent No.: US 9,542,752 B2
(45) Date of Patent: Jan. 10, 2017

(54) DOCUMENT IMAGE COMPRESSION METHOD AND ITS APPLICATION IN DOCUMENT AUTHENTICATION

(71) Applicant: KONICA MINOLTA LABORATORY U.S.A., INC., San Mateo, CA (US)

(72) Inventors: Yibin Tian, Menlo Park, CA (US); Wei Ming, Cupertino, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days.

(21) Appl. No.: 14/951,701

(22) Filed: Nov. 25, 2015

(65) Prior Publication Data

US 2016/0078632 A1 Mar. 17, 2016

Related U.S. Application Data

(63) Continuation of application No. 13/730,757, filed on Dec. 28, 2012, now Pat. No. 9,230,383.

(51) Int. Cl.
*G06K 9/62* (2006.01)
*G06T 7/00* (2006.01)
(Continued)

(52) U.S. Cl.
CPC ......... *G06T 7/0081* (2013.01); *G06K 9/00456* (2013.01); *G06K 9/00577* (2013.01);
(Continued)

(58) Field of Classification Search
CPC .............................. G06K 9/6201; G06K 9/6255
(Continued)

(56) References Cited

U.S. PATENT DOCUMENTS 3,846,755 A 11/1974 Hart
4,183,013 A 1/1980 Agrawala et al.
(Continued)

OTHER PUBLICATIONS

Weideman et al. ("A Comparison of a Nearest Neighbor Classifier and a Neural Network for Numeric Handprint Character Recognition," Proceedings of International Joint Conference on Neural Networks, Jun. 18-22, 1989, vol. 1, pp. 117-120).*

(Continued)

*Primary Examiner* — Yubin Hung
(74) *Attorney, Agent, or Firm* — Chen Yoshimura LLP

(57) ABSTRACT

A method for compressing a bi-level document image containing text is disclosed. The document image is segmented into symbol images each representing a letter, numeral, etc. in the document. The symbol images are classified into a plurality of classes, each class being associated with a template image and a class index. Classification is done by comparing each symbol to be classified with template of existing classes, using a number of image features including zoning profiles, side profiles, topology statistics, and low-order image moments. These image features are compared using a tolerance based method to determine whether the symbol matches the template. After classification, certain classes that have few symbols classified into them may be merged with other classes. In addition, the template images of the classes are down-sampled, where the final sizes of the template images are dependent on the likelihood of confusion of the template with other templates.

14 Claims, 4 Drawing Sheets

(51) Int. Cl.
- *G07D 7/00* (2016.01)
- *G07D 7/20* (2016.01)
- *G06K 9/00* (2006.01)
- *G06K 9/34* (2006.01)
- *G06K 9/18* (2006.01)
- *H04N 1/40* (2006.01)

(52) U.S. Cl.
CPC ............... *G06K 9/18* (2013.01); *G06K 9/342* (2013.01); *G06K 9/6202* (2013.01); *G06K 9/6255* (2013.01); *G07D 7/004* (2013.01); *G07D 7/0026* (2013.01); *G07D 7/20* (2013.01); *G07D 7/2033* (2013.01); *G07D 7/2041* (2013.01); *G07D 7/2058* (2013.01); *G07D 7/2083* (2013.01); *H04N 1/40062* (2013.01); *G06K 9/6201* (2013.01); *G06K 2209/01* (2013.01); *G06T 2207/10004* (2013.01); *G06T 2207/30176* (2013.01)

(58) Field of Classification Search
USPC .................................. 382/182, 185, 217, 232
See application file for complete search history.

(56) References Cited

U.S. PATENT DOCUMENTS

| | | | |
|---|---|---|---|
| 4,790,024 A | 12/1988 | Peppers et al. | |
| 5,245,674 A | 9/1993 | Cass et al. | |
| 5,303,313 A | 4/1994 | Mark et al. | |
| 5,359,667 A | 10/1994 | Borowski et al. | |
| 5,539,840 A | 7/1996 | Krtolica et al. | |
| 5,778,095 A * | 7/1998 | Davies | G06K 9/6255 382/190 |
| 5,806,030 A * | 9/1998 | Junqua | G10L 15/04 704/240 |
| 5,809,167 A * | 9/1998 | Al-Hussein | G06K 9/00463 382/176 |
| 6,020,972 A | 2/2000 | Mahoney et al. | |
| 8,583,648 B1 * | 11/2013 | Majkowska | G06F 17/30011 707/737 |
| 2005/0185845 A1 | 8/2005 | Luo et al. | |
| 2005/0286747 A1 | 12/2005 | Azuma et al. | |
| 2006/0029276 A1 * | 2/2006 | Nagahashi | G06K 9/00228 382/173 |
| 2007/0223812 A1 * | 9/2007 | Ito | G06K 9/00248 382/165 |
| 2007/0230784 A1 | 10/2007 | Nakamura | |
| 2008/0069437 A1 | 3/2008 | Baker | |
| 2009/0119010 A1 | 5/2009 | Moravec | |
| 2009/0259652 A1 * | 10/2009 | Yamane | G06F 17/30598 |
| 2010/0310123 A1 | 12/2010 | Fahn et al. | |
| 2010/0310158 A1 | 12/2010 | Fu et al. | |
| 2011/0082859 A1 * | 4/2011 | Deng | G06F 17/30451 707/728 |
| 2011/0194780 A1 * | 8/2011 | Li | G06F 17/3025 382/218 |
| 2011/0249897 A1 * | 10/2011 | Chaki | G06K 9/34 382/177 |
| 2011/0305399 A1 | 12/2011 | Zitnick et al. | |
| 2011/0312374 A1 | 12/2011 | Chen et al. | |
| 2012/0051645 A1 | 3/2012 | Sun | |
| 2012/0237116 A1 | 9/2012 | Xiao | |

OTHER PUBLICATIONS

Song et al. ("An algorithm for eliminating the isolated regions based on connected area in image classification ," Proceedings of IEEE Geoscience and Remote Sensing Symposium, Sep. 20-24, 2004).*

"JBIG2", Wikipedia, http://en.wikipedia.org/wiki/JBIG2, 5 pages, printed from the Internet on Dec. 2, 2012.

Weideman et al., "A comparison of a nearest neighbor classifier and a neural network for numeric handprint character recognition", Proceedings of International Joint Conference on Neural Networks, Jun. 18-22, 1989, vol. 1, pp. 117-120.

* cited by examiner

DOCUMENT IMAGE COMPRESSION METHOD AND ITS APPLICATION IN DOCUMENT AUTHENTICATION

BACKGROUND OF THE INVENTION

Field of the Invention

This invention relates to an image compression method, and in particular, it relates to a method of compressing document images containing text, as well as its application in document authentication.

Description of Related Art

Original digital documents, which may include text, graphics, pictures, etc., are often printed, and the printed hard copy are distributed, copied, etc., and then often scanned back into digital form. Authenticating a scanned digital document refers to determining whether the scanned document is an authentic copy of the original digital document, i.e., whether the document has been altered while it was in the hard copy form. Alteration may occur due to deliberate effort or accidental events. Authentication of a document in a closed-loop process refers to generating a printed document that carries authentication data on the document itself, and authenticating the scanned-back document using the authentication data extracted from the scanned document. Such a printed document is said to be self-authenticating because no information other than what is on the printed document is required to authenticate its content.

Methods have been proposed to generate self-authenticating documents using barcode, in particular, two-dimensional (2d) barcode. Specifically, such methods include processing the content of the document (text, graphics, pictures, etc.) and converting it into authentication data which is a representation of the document content, encoding the authentication data in a 2d barcode (the authentication barcode), and printing the barcode on the same recording medium as the original document content. This results in a self-authenticating document. To authenticate such a printed document, the document is scanned to obtain a scanned image. The authentication barcode is also scanned and the authentication data contained therein is extracted. The scanned image is then processed and compared to the authentication data to determine if any part of the printed document has been altered, i.e. whether the document is authentic. Some authentication technologies are able to determine what is altered, and/or where is altered, some merely determine whether any alterations have occurred.

JBIG2 is an international standard for compression of bi-level images, in particular document images containing text. It utilizes a pattern matching and substitution method, by which the image is segmented into multiple symbols and a symbol dictionary is developed; each symbol in the document image is matched to a symbol in the dictionary, and encoded by an index to the dictionary entry and the location and size of the symbol in the image.

SUMMARY

The present invention is directed to an improved compression method for compressing bi-level images, in particular document images containing text.

An object of the present invention is to provide an efficient image compression method for documents containing text.

Another object of the present invention is to provide a method for generating a self-authenticating printed document carrying authentication information.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for compressing a binary image representing a document containing text regions, the method including: (a) segmenting the text regions into a plurality of symbol images, each symbol image representing a symbol of text, each symbol image being bound by a bounding box having a location and a size; (b) classifying each symbol image obtained in step (a) into one of a plurality of classes, each class being represented by a template image and a class index, including, for each symbol image being classified: (b1) comparing the symbol image with each template image to determine whether they match each other, including comparing a plurality of features of the symbol image with the corresponding plurality of features of the template image, the plurality of features including density statistics features, side profile features, topology statistics features and shape features; (b2) if a match is found in step (b1), recording the class index corresponding to the matched template in association with the symbol image being classified; and (b3) if no match is found in step (b1), adding a new class to the plurality of classes, by using the image of the symbol image being classified as the template image of the new class and assigning a class index to the new class, and recording the class index in association with the symbol image being classified; (c) resizing the template image of each class to a final size; and (d) storing, as compressed image data, the resized template image for each of the plurality of classes along with its class index, the bounding box location and size for each symbol image obtained in step (a), and the class index for each symbol image obtained in step (b2) or (b3).

In some embodiments, the density statistics features include zoning profile features, and the shape features include low-order moment features.

In another aspect, the present invention provides a method for compressing a binary image representing a document containing text regions, the method including: (a) segmenting the text regions into a plurality of symbol images, each symbol image representing a symbol of text, each symbol image being bound by a bounding box having a location and a size; (b) classifying each symbol image obtained in step (a) into one of a plurality of classes, each class being represented by a template image and a class index, including, for each symbol image being classified: (b1) comparing the symbol image with each template image to determine whether they match each other; (b2) if a match is found in step (b1), recording the class index corresponding to the matched template in association with the symbol image being classified; and (b3) if no match is found in step (b1), adding a new class to the plurality of classes, by using the image of the symbol image being classified as the template image of the new class and assigning a class index to the new class, and recording the class index in association with the symbol image being classified; (c) resizing the template image of each class to a final size, wherein the final sizes for at least some template images are different from each other, including: (c1) calculating a similarity measure between each template image with each other template image; (c2) determining a final size for each template image based on the calculated similarity measure with other template images; and (c3) resizing each template image to the final size determined in step (c2); and (d) storing, as compressed image data, the resized template image for each of the plurality of classes along with its class index, the bounding box location and size for each symbol image obtained in step (a), and the class index for each symbol image obtained in step (b2) or (b3).

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

BRIEF DESCRIPTION OF THE DRAWINGS

FIG. 3A illustrates a method of processing a document image to generate compressed image data and printing the document with barcode encoding the authentication data; FIG. 3B illustrates a method of authenticating a scanned document using the compressed image data encoded in the barcode.

DETAILED DESCRIPTION OF PREFERRED EMBODIMENTS

The methods described here can be implemented in a data processing system which includes a processor, memory and a storage device. The data processing system may be a standalone computer connected to printers, scanners, copiers and/or multi-function devices, or it may be contained in a printer, a scanner, a copier or a multi-function device. The data processing system carries out the method by the processor executing computer programs stored in the storage device. In one aspect, the invention is a method carried out by a data processing system. In another aspect, the invention is computer program product embodied in computer usable non-transitory medium (storage device) having a computer readable program code embedded therein for controlling a data processing apparatus. In another aspect, the invention is embodied in a data processing system.

Figure 1:
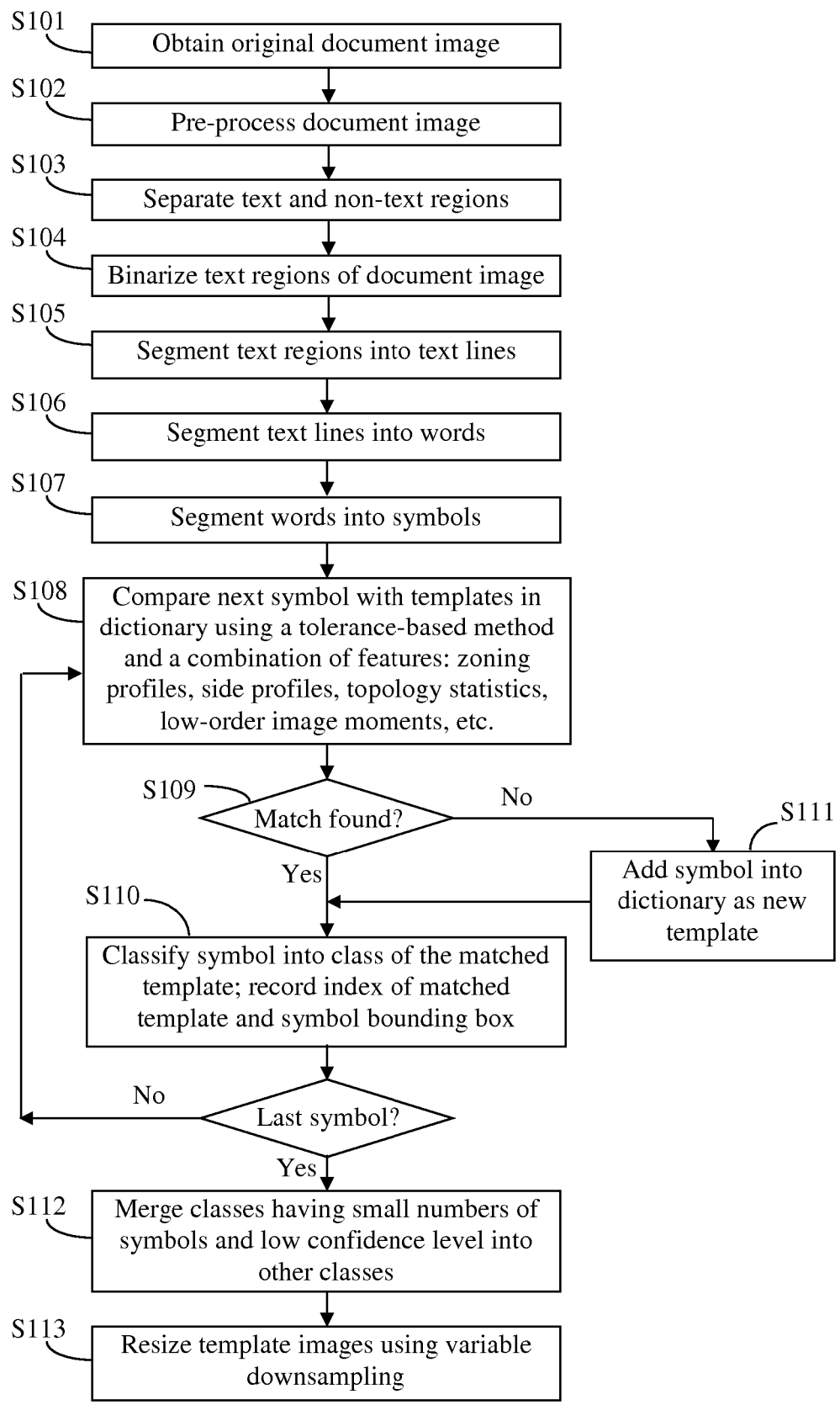
FIG. 1 schematically illustrates an image compression method for compressing document images containing text according an embodiment of the present invention.

FIG. 1 schematically illustrates an image compression method for compressing document images containing text according an embodiment of the present invention. First, an electronic document image is obtained (step S101). Here the term "image" refers to a bitmap image, where each image pixel may have a binary value, a gray scale value or color values. A document image refers to an image that contains substantial amount of text in its content, although it may also contain non-text content such as graphics and pictures. The document image may be obtained by scanning a hard copy document, by taking a photograph of a hard copy document with a camera, by generating an image electronically from another electronic document, by receiving it from an external source, etc. The document image may optionally be pre-processed, which may include de-noising (i.e. removal of small, isolated black dots), de-skewing, and/or correction of perspective distortions if the image was generated by a camera (step S102). These processes are carried out based on the assumption that a text document should generally have a uniform and clean background, a preferred orientation where the lines of text are generally horizontal or vertical, and a front perspective from infinity. Any suitable techniques may be used to implement these pre-processing steps.

The text regions and non-text (e.g. picture, graphics) regions of the document image are separated (step S103), and the text regions are then binarized to generate a binary image (step S104). Any suitable text separation methods and binarization methods may be used. The binarized text regions are segmented into lines of text (step S105), the lines are segmented into words (step S106), and the words are further segmented into symbols (step S107). Each symbol is a character such as letter, numeral, or some other symbol, and is represented as an image patch. It should be noted that in this disclosure, the terms "words" and "symbols" refer to image patches corresponding to words or symbols, not words or symbols in ASCII representation. Line segmentation may be done by, for example, analyzing the horizontal projection profile or connected components of the image of a text region, or other suitable methods. Word and symbol segmentation may be done by, for example, a morphological operation and connected component analysis, or other suitable methods. As the result of segmentation, bounding boxes for each text line, word and symbol are obtained. A bounding box is a box that bounds the text line, word or symbol. Each bounding box is defined by its location and size.

Then, each symbol is classified into one of a plurality of classes represented by templates (steps S108-S111). A template is an image of a unique symbol in the document image. A collection of templates (sometimes referred to as a dictionary) is established for the document image, where each template in the dictionary is different from the other templates as measured by a combination of features as will be described later. Each template in the dictionary has a corresponding class index. In the classification process, a symbol to be classified is compared to each template already in the dictionary to determine if the symbol to be classified matches any of the templates (step S108). If a match is found ("Yes" in step S109), the symbol is classified into the class represented by the matched template, and the corresponding class index, as well as the bounding box (location and size) of the symbol to be classified, are recorded (step S110). If multiple matches are found by the comparison step, the symbol is classified into the class that results in the best match. If a match is not found ("No" in step S109), the symbol is added to the dictionary as a new template with a new class index assigned to it (step S111), and the class index of the newly added class and the bounding box of the symbol are recorded (step S110). The dictionary for the document is empty originally, and is built up this way as the symbols in the document image are processed. Steps S108 to S111 are repeated until all symbols of the document image are processed.

The comparing step S108 uses a combination of a number of image features of the symbols. The features include, for example, zoning profiles, side profiles, topology statistics, low-order image moments, etc.

A zoning profile is generated by dividing the pixel block of a symbol (for example, a 100×100 pixel block) into a number of zones, such as m×n zones (m zones vertically and n zones horizontally). The average densities of the zones form an m×n matrix referred to as the zoning profile.

Figure 4:
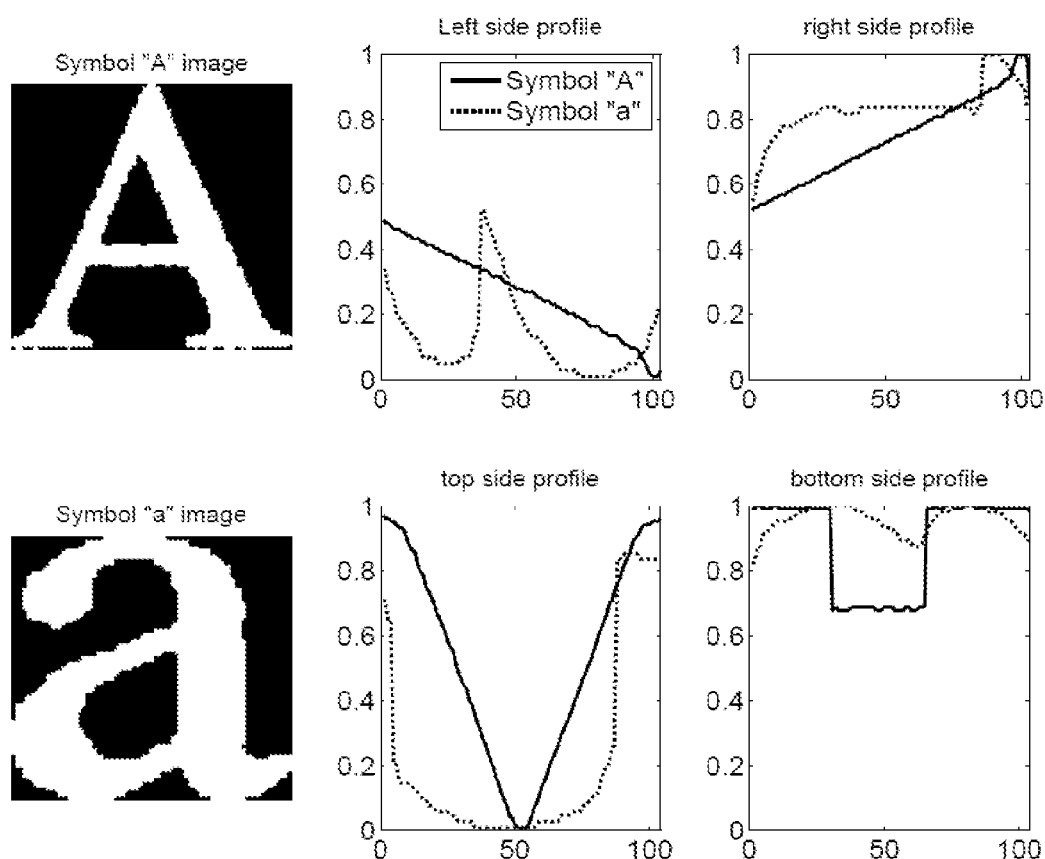
FIG. 4 depicts exemplary side profiles of two symbols which may be used in symbol comparison.

A side profile of a symbol is the profile of the symbol viewed from one side of its bounding box, such as left, right, top and bottom. FIG. 4 depicts two symbols "a" and "A" and their four side profiles. The side profiles may be normalized (e.g. to between 0 and 1) for purpose of comparison; normalization is done by dividing the raw side profiles by the height of the symbol (for left and right profiles) or the width of the symbol (for top and bottom profiles). Side profiles may also be put into smaller number of bins than the number of pixel of the height or width of the symbol.

The topology statistics of a symbol may include, for example, the number of holes, the number of branch points, the number of end points, etc. in the symbol. A branch point of a symbol is the point on the symbol skeleton where at least three of its neighbors are also on the skeleton. An end of a symbol is the point on the symbol skeleton where one and only one of its neighbors is also on the skeleton. For example, the symbol "6" has one hole, one branching point and one end point; the symbol "a" has one hole, two branching points and two end points, etc.

Generic image moments are defined as:

$$M(p, q) = \sum_{y=1}^{H} \sum_{x=1}^{W} f(x^p, y^q) I(x, y)$$

where $f(x^p, y^q)$ is a function of $x^p$ and $y^q$, H and W are the height and width of the image, and I(x,y) the image pixel value at (x, y). Depending on the specific format of $f(x^p, y^q)$, there are a number of moments described in the literature, such as geometrical moments, Zernike moments, Chebyshev moments, Krawtchouk moments and so on. Low-order moments are moments whose orders (as represented by (p+q)) are low, such as below 5. Low-order moments are less sensitive to minor image distortions compared to higher-order moments. These moments are preferably normalized.

Various different approaches may be used to compare the symbol to be classified and a symbol template in the dictionary using the above image features. In one example, a difference measure for each feature is calculated and a threshold value is set for the difference measure. The multiple features may be evaluated sequentially, so that if the difference measure for a feature exceeds the corresponding threshold, the template is determined to be a non-match without evaluating the rest of the features, and the comparison goes to the next template. In another example, an overall difference measure may be calculated from the difference measures of the multiple features, and a threshold is used to determine a match. Other ways of combining the features may also be used. One approach, a tolerance-based comparison using a combination of feature, is described in detail below.

For each symbol, a number of feature values can be calculated for each category of features:

Zoning profiles: $(z_1, z_2, \ldots, z_k)$, k feature values

Side profiles: $(s_1, s_2, \ldots, s_n)$, n feature values

Topology statistics: $(t_1, t_2, \ldots, t_p)$, p feature values

Low-order moments: $(m_1, m_2, \ldots, m_q)$, q feature values

The total number of feature values is (k+n+p+q). For each category of features, one or more tolerance levels may be set. For example, a single tolerance level $L_z$ may be set for all feature values in the zoning profile category, another single tolerance levels $L_s$ may be set for all feature values in the side profile category, yet another single tolerance levels $L_m$ may be set for all feature values in the low-order moment category. For topology statistics category, it is preferable to set multiple tolerance levels $(L_{t1}, L_{t2}, \ldots, L_{tp})$ as these feature values may vary significantly. Alternatively, each feature value in each category may have its own tolerance level; in such a case a total of (k+n+p+q) tolerance levels will be set for the total of (k+n+p+q) feature values. The tolerance levels may be set in advance, or determined empirically by means of statistical analysis or a variety of machine learning methods using a large number of symbol image samples of different fonts and sizes.

For each symbol to be classified, its multiple feature values are compared to those of each existing templates. For each feature, it is determined whether (Eq. 1)

$$\left| \frac{x - x^0}{x^0} \right| > L$$

where x is a feature value of the symbol to be classified, $x^0$ is the corresponding feature value of the existing template being compared to, and L is the tolerance for that feature value. In other words, if the difference between the feature values of the symbol and the template is greater than a given proportion (L) of the feature value of the template, this feature value is determined to exceed the tolerance. The number of feature values that exceed their tolerances (referred to as the number of different features, or ND, for convenience) is accumulated for each category of features.

The decision of whether the symbol image is the same as or different from the template image can be made in a number of ways using these ND values. In one implementation, if the number of different features for at least one category is greater than a given proportion of the number of features in that category, the symbol to be classified is deemed different from the template (Eq. 2):

IsDiff=$(ND_z > T_{ND,z}) | (ND_s > T_{ND,s}) | (ND_t > T_{ND,t}) | (ND_m > T_{ND,m})$ where $ND_z$, $ND_s$, $ND_t$, and $ND_m$ are the numbers of different features in the four categories (zoning profiles, side profiles, topology statistics and low-order moments) respectively; and $T_{ND,z}$, $T_{ND,s}$, $T_{ND,t}$ and $T_{ND,m}$ are thresholds for the corresponding difference numbers. These thresholds may be set as proportions of the number of feature values in the corresponding categories; e.g., $T_{ND,z}$ may be set as a pre-determined proportion of k, etc. All or some of the proportions for the four categories may be the same. Because the values k, n, p and q are know beforehand, setting the thresholds as pre-determined proportions of these numbers is equivalent to setting the thresholds as pre-determined values. Similar to the tolerance levels L, these thresholds are either determined in advance of empirically from a large number of symbol image samples of different fonts and sizes. In the above equation, "|" denotes "OR".

An equivalent expression is, the symbol to be classified is deemed the same as the template if for each of the categories of features, the numbers of different feature is smaller than or equal to a given proportion of the number of features in that category (Eq. 3):

$$\text{IsSame} = (ND_z \le T_{ND,z}) \& (ND_s \le T_{ND,s}) \& (ND_t \le T_{ND,t}) \& (ND_m \le T_{ND,m})$$

where "&" denotes "AND".

In another implementation, the symbol to be classified is deemed the same as the template if the total numbers of different features in all categories are smaller than a given proportion of the total number of features (Eq. 4):

$$\text{IsSame} = (ND_z + ND_s + ND_t + ND_m) \le T_{ND}$$

or equivalently (Eq. 5):

$$\text{IsDiff} = (ND_z + ND_s + ND_t + ND_m) > T_{ND}$$

where $T_{ND}$ is the threshold for the total number of different feature values. This threshold may be set as a pre-determined proportion of the total number of feature values, i.e. (k+n+p+q), or it may be set as a pre-determined value.

Figure 2:
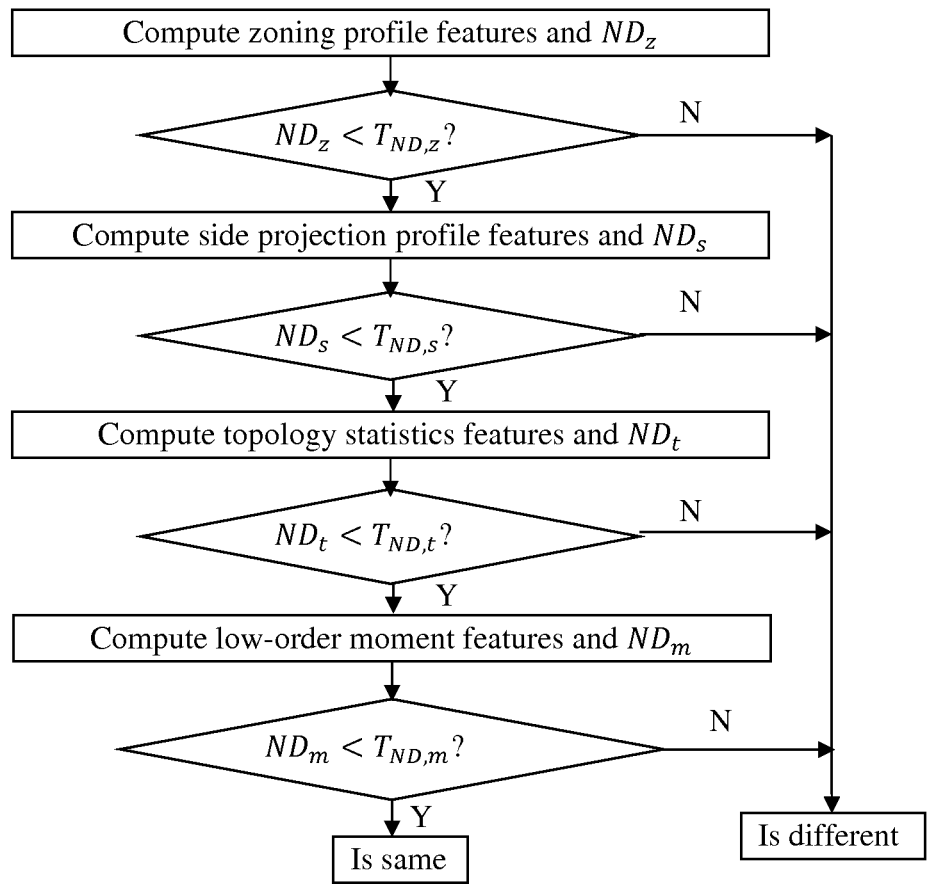
FIG. 2 schematically illustrates a process for comparing two symbol images using various image features according to an embodiment of the present invention.

In another implementation, the multiple categories of features are evaluated in a cascade manner to speed up computation. An example is shown in the flow chart of FIG. 2. The order of the cascade can be arranged in a number of different ways, such as in the increasing order of the computational complexity for the categories of features (that is, faster features are evaluated earlier), or in the increasing order of the discriminating power of the categories of features (that is, features that can separate more symbols are evaluated earlier), or a combination of the above.

In the event that the symbol to be classified is deemed (by the above comparison method) to be the same as two or more templates, the template that resulted in the lowest difference, for example, the smallest value of total number of different features, i.e. $(ND_z + ND_s + ND_t + ND_m)$, is used as the matching template in step S109.

The feature values of the templates, used in the comparison step S108, are stored during the comparing process. The feature values for each template may be computed as the average feature values from all symbols currently classified into that class, or computed as feature values of the first symbol classified into that class. If the average method is used, the feature values for a template are updated every time a symbol is classified into the class.

While the above descriptions give details of the various image features used in the preferred embodiments, it should be noted that other suitable image features may be used as well. For example, zoning profiles are examples of density statistics, and other density statistics may be used as well. Low-order image moments are examples of shape features, and other shape features may be used as well. In the preferred embodiments, different types of features, including density statistics (e.g. zoning profile features), side profile features, topology statistics and shape features (e.g. low-order moments) are used to more fully capture the characteristics of the symbol images to arrive at a more accurate comparison.

It should be noted that the comparison method used in step S108 can match the shapes of two symbols regardless of their relative sizes. Thus, for example, two letters having the same font but different sizes will be classified into the same class (same template). For each symbol, both its location and its size (as described by the bounding box) are recorded in step S110.

Optionally, after all symbols in the document image are classified into classes, some classes that have very small numbers of symbols classified into them may be merged with other classes (step S112). To do this, a record is kept for the number of symbols that has been classified into each class; this record is updated in step S110 after each symbol is classified. In addition, in the comparison step S108, a set of stricter tolerance or threshold values corresponding to the L's, $T_{ND,z}$, $T_{ND,s}$, $T_{ND,t}$ and $T_{ND,m}$, $T_{ND}$ etc. values are set to indicate the confidence level of the classification. That is, even if the symbol is deemed the same as a particular template under the first set of tolerance and threshold values (L's and T's) (and therefore the symbol is classified into the class of that template), the classification of the symbol may be flagged as being "low confidence" if the symbol cannot be deemed the same as the template under the stricter set of tolerance and threshold values. Then, in step S112, if the total number of symbols classified into a particular class is low (below a pre-set threshold), and the number of low-confidence symbol classifications for that class is high (higher than another threshold, which may be set as a percentage of the number of symbols classified into that class), that class may be merged with another class.

To determine which other class to merge into, the template image of the class to be merged is compared with other templates in the dictionary, such as by using the same image features as used in step S108, and the template that has the smallest difference relative to the template to be merged may be selected as the class to merge into. If, however, no other template has a sufficiently small difference relative to the template to be merged, then the merge will not be carried out.

In an alternative implementation, a similarity measure (or likelihood of confusion) is computed between each pair of templates, and pairs that have high similarity with each other may be merged into one class. The similarity between two templates may be measured by the total number of different feature values between them, i.e. $(ND_z + ND_s + ND_t + Na_m)$, or the ratio of this number to the total number of feature values in the comparison, i.e. (k+n+p+q).

Merging a first class into a second class may be carried out by deleting the template image of the first class, and replacing it with a link to the template image of the second class. This way, no changes need to be made to the assigned class indices of the symbols that have been classified into the first class; instead, the class index of the first class will now be associated with the template image of the second class.

Merging of classes has benefits but also tradeoffs. The main benefit of merging classes is to reduce the size of the compressed data by reducing the number of template images to be stored. Thus, merging only needs to be carried out if the number of classes is too high given a particular upper limit of data amount of the compressed data. For example, in a document authentication application as will be described in more detail later, the number and size of barcodes for storing authentication data are limited; merging classes will help reduce compressed data to a certain size. On the other hand, the possibility of misclassification increases with merging. However, in certain situations, e.g. when the original image quality is poor, different instances of the same symbol may be classified into different classes, resulting in multiple classes for the same actual symbol. In such situations, merging of classes may result in some of these multiple classes being merged into the same class. This may in fact result in a more accurate classification, and will help to reduce false positive in the authentication process. To summarize, there is a trade-off between the number of classes in the output and the error rate of misclassification. For these reasons, the merging step optional; when it is used, the various tolerance and/or threshold values used to determine merging should be set appropriately to balance the trade-offs.

After all symbols are classified, the images representing the template are resized (step S113). One purpose of resizing is to reduce the amount of data to be stored by reducing the template image sizes. Any suitable down-sampling methods may be used to resize the template images, including conventional nearest-neighbor, bilinear or bicubic interpolation methods. Preferably, a topology-preserving down sampling method is used so that thin lines of the characters do not become broken after down sampling.

In one embodiment, all template images are resized to the same final size. The size of the resized template image may be set by a user or set automatically based on a target size of the compressed data.

In another embodiment (preferred), the template images are resized to different final sizes, which are determined by various factors. This is referred to as template-dependent variable down-sampling. One factor that may be used to determine the final size for each template is the similarity measure (or likelihood of confusion) of each template image with other template images of the same document. The similarity between two template images may be measured by the total number of different feature values between them, i.e. ($ND_z+ND_s+ND_t+ND_m$), or the ratio of this number to the total number of feature values in the comparison, i.e. (k+n+p+q). The difference numbers $ND_z$, $ND_s$, $ND_t$ and $ND_m$ can be calculated in a similar manner as in step S108.

Generally, template images that have higher similarity (likelihoods of confusion) with other template images are given larger final template image size to mitigate confusion. In one implementation, the templates are separated into two groups based on their likelihoods confusion with other templates; one group (with lower likelihoods of confusion) is down-sampled more to result in smaller template images (for example, 15×15 pixels), and the other group (with higher likelihoods of confusion) is down-sampled less to result in larger template images (for example, 25×25 pixels).

Alternatively, the final template image sizes may depend on the total number of symbols classified into the classes; larger template image size is preferred for a class that has relatively few symbols classified into it. In addition, the final template image size may also depend on symbol type (such as numerals vs. letters), pre-defined precision, data location pre-specified by user, and so on. Preferably, if the final template image sizes are automatically determined by the system, a pre-defined minimum size should be set to achieve required accuracy.

The above-described image compression method generates the following data which constitutes compressed data for the document image: the template images with their corresponding class indices, and for each symbol in the document image, the symbol bounding box (location and size) and the class index assigned to it in the classification process (step S110).

To decompress the image, each symbol of the document is restored by placing a template image corresponding to the class index of the symbol in the bounding box of the symbol. This includes re-sizing the template image to the size of the symbol bounding box.

While the image compression method described above has certain similarities to JBIG2, it uses a novel symbol comparison method to compare the symbol image and the template image. In addition, it uses variable down-sampling to improve compression efficiency.

Figure 3A:
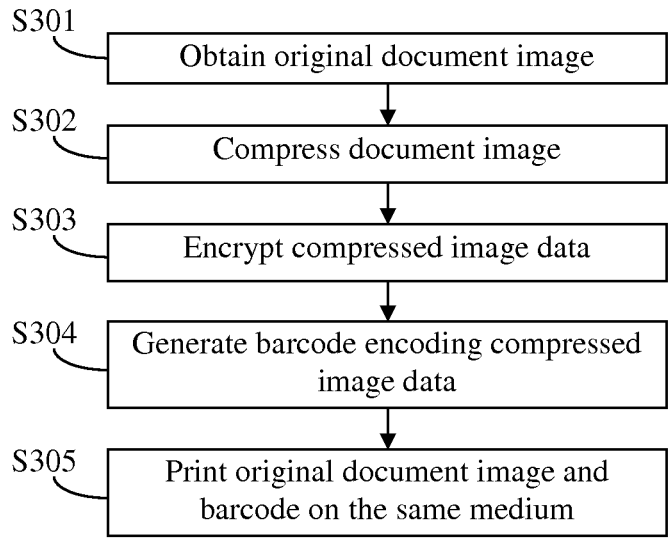
FIGS. 3A and 3B schematically illustrate a process for generating and authenticating a printed document, in which the image compression method according to embodiments of the present invention may be applied.

One practical application of this image compression method is document authentication, in which the image compression method is used to generate a self-authenticating printed document. FIG. 3A schematically illustrates such a method. For a document to be printed, a document image is obtained (step S301). The document image is compressed using the compression method described above to generate authentication data (step S302). The authentication data is optionally encrypted (step S303), and encoded into barcode (step S304). The document image and the barcode are printed on the same medium which functions as a self-authenticating printed document (step S305). The barcode (including one or more barcode stamps) may be printed on the front side and/or the back side of the document.

Figure 3B:
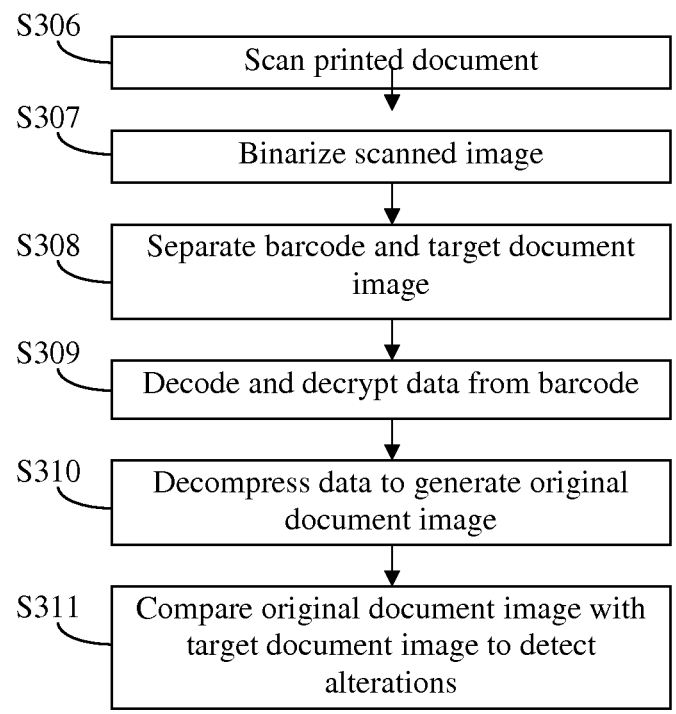

FIG. 3B schematically illustrates a process of authenticating a printed document which carries barcode that has been generated using the process of FIG. 3A. The printed document is scanned, or photographed or otherwise imaged to generate an electronic document image (step S306). The scanned image is optionally pre-processed, including de-noising, de-skewing, and/or correction of perspective distortions, and binarized (step S307). The barcode and the text regions in the scanned image (target document image) are separated (step S308). The barcode is decoded and the data is decrypted as necessary to obtain the authentication data contained therein (step S309). The data is decompressed to generate the original document image (step S310). The original document image and the target document image are compared to detect any alteration (step S311). Any suitable image compression methods may be used in this step.

It will be apparent to those skilled in the art that various modification and variations can be made in the document authentication method and apparatus of the present invention without departing from the spirit or scope of the invention. Thus, it is intended that the present invention cover modifications and variations that come within the scope of the appended claims and their equivalents.

What is claimed is:

1. A method for compressing a binary image representing a document containing text regions, the method comprising:
   (a) segmenting the text regions into a plurality of symbol images, each symbol image representing a symbol of text, each symbol image being bound by a bounding box having a location and a size;
   (b) classifying each symbol image obtained in step (a) into one of a plurality of classes, each class being represented by a template image and a class index, including, for each symbol image being classified:
   (b1) comparing the symbol image with each template image to determine whether they match each other;
   (b2) if a match is found in step (b1), recording the class index corresponding to the matched template in association with the symbol image being classified; and
   (b3) if no match is found in step (b1), adding a new class to the plurality of classes, by using the image of the symbol image being classified as the template image of the new class and assigning a class index to the new class, and recording the class index in association with the symbol image being classified;
   (c) merging a first one of the plurality of classes into a second one of the plurality of classes if a total number of symbol images classified into the first class in step (b) is below a threshold and a measure of confidence of classification for the first class is below another threshold;
   (d) resizing, after step (c), the template image of each class to a final size; and (e) storing, as compressed image data, the resized template image for each of the plurality of classes along with its class index, the bounding box location and size for each symbol image obtained in step (a), and the class index for each symbol image obtained in step (b2) or (b3).

2. The method of claim 1, wherein step (a) includes segmenting the text regions into a plurality of lines, segmenting the lines into a plurality of words, and segmenting the words into the plurality of symbol images.

3. The method of claim 1, wherein in step (d), the final sizes for at least some template images are different from each other, wherein step (d) includes:
(d1) calculating a similarity measure between each template image with each other template image;
(d2) determining a final size for each template image based on the calculated similarity measure with other template images; and
(d3) resizing each template image to the final size determined in step (d2).

4. The method of claim 3, wherein step (d1) includes, for each pair of template images:
calculating a first, a second, a third and a fourth difference number representing, respectively, a number of zoning profile features, a number of side profile features, a number of topology statistics features, and a number of low-order moment features of the pair of template image that are different from each other; and
summing the first through fourth difference numbers as the similarity measure.

5. The method of claim 1, wherein step (b1) includes comparing a plurality of features of the symbol image with the corresponding plurality of features of the template image, the plurality of features including density statistics features, side profile features, topology statistics features and shape features.

6. The method of claim 5, wherein the density statistics features include zoning profile features, wherein the shape features include low-order moment features, and
wherein step (b1) includes, for each template image being compared:
calculating a first, a second, a third and a fourth difference number representing, respectively, a number of zoning profile features, a number of side profile features, a number of topology statistics features, and a number of low-order moment features of the symbol image that are different from corresponding features of the template image; and
wherein the symbol image and the template image are determined to match each other if: the first difference number is smaller than or equal to a first threshold value, the second difference number is smaller than or equal to a second threshold value, the third difference number is smaller than or equal to a third threshold value, and the fourth difference number is smaller than or equal to a fourth threshold value.

7. The method of claim 5, wherein the density statistics features include zoning profile features, wherein the shape features include low-order moment features, and
wherein step (b1) includes, for each template image being compared:
calculating a first, a second, a third and a fourth difference number representing, respectively, a number of zoning profile features, a number of side profile features, a number of topology statistics features, and a number of low-order moment features of the symbol image that are different from corresponding features of the template image; and
wherein the symbol image and the template image are determined to match each other if a sum of the first through fourth difference numbers is smaller than or equal to a threshold value.

8. A computer program product comprising a computer usable non-transitory medium having a computer readable program code embedded therein for controlling a data processing apparatus, the computer readable program code configured to cause the data processing apparatus to execute a process for compressing a binary image representing a document containing text regions, the process comprising:
(a) segmenting the text regions into a plurality of symbol images, each symbol image representing a symbol of text, each symbol image being bound by a bounding box having a location and a size;
(b) classifying each symbol image obtained in step (a) into one of a plurality of classes, each class being represented by a template image and a class index, including, for each symbol image being classified:
(b1) comparing the symbol image with each template image to determine whether they match each other;
(b2) if a match is found in step (b1), recording the class index corresponding to the matched template in association with the symbol image being classified; and
(b3) if no match is found in step (b1), adding a new class to the plurality of classes, by using the image of the symbol image being classified as the template image of the new class and assigning a class index to the new class, and recording the class index in association with the symbol image being classified;
(c) merging a first one of the plurality of classes into a second one of the plurality of classes if a total number of symbol images classified into the first class in step (b) is below a threshold and a measure of confidence of classification for the first class is below another threshold;
(d) resizing the template image of each class to a final size; and
(e) storing, as compressed image data, the resized template image for each of the plurality of classes along with its class index, the bounding box location and size for each symbol image obtained in step (a), and the class index for each symbol image obtained in step (b2) or (b3).

9. The computer program product of claim 8, wherein step (a) includes segmenting the text regions into a plurality of lines, segmenting the lines into a plurality of words, and segmenting the words into the plurality of symbol images.

10. The computer program product of claim 8, wherein in step (d), the final sizes for at least some template images are different from each other, wherein step (d) includes:
(d1) calculating a similarity measure between each template image with each other template image;
(d2) determining a final size for each template image based on the calculated similarity measure with other template images; and
(d3) resizing each template image to the final size determined in step (c2).

11. The computer program product of claim 10, wherein step (d1) includes, for each pair of template images:
calculating a first, a second, a third and a fourth difference number representing, respectively, a number of zoning profile features, a number of side profile features, a number of topology statistics features, and a number of low-order moment features of the pair of template image that are different from each other; and summing the first through fourth difference numbers as the similarity measure.

12. The computer program product of claim 8, wherein step (b1) includes comparing a plurality of features of the symbol image with the corresponding plurality of features of the template image, the plurality of features including density statistics features, side profile features, topology statistics features and shape features.

13. The computer program product of claim 12, wherein the density statistics features include zoning profile features, wherein the shape features include low-order moment features, and wherein step (b1) includes, for each template image being compared:

calculating a first, a second, a third and a fourth difference number representing, respectively, a number of zoning profile features, a number of side profile features, a number of topology statistics features, and a number of low-order moment features of the symbol image that are different from corresponding features of the template image; and wherein the symbol image and the template image are determined to match each other if: the first difference number is smaller than or equal to a first threshold value, the second difference number is smaller than or equal to a second threshold value, the third difference number is smaller than or equal to a third threshold value, and the fourth difference number is smaller than or equal to a fourth threshold value.

14. The computer program product of claim 12, wherein the density statistics features include zoning profile features, wherein the shape features include low-order moment features, and wherein step (b1) includes, for each template image being compared:

calculating a first, a second, a third and a fourth difference number representing, respectively, a number of zoning profile features, a number of side profile features, a number of topology statistics features, and a number of low-order moment features of the symbol image that are different from corresponding features of the template image; and wherein the symbol image and the template image are determined to match each other if a sum of the first through fourth difference numbers is smaller than or equal to a threshold value.

\* \* \* \* \*